United States Patent
Francu et al.

(10) Patent No.: US 12,263,833 B2
(45) Date of Patent: Apr. 1, 2025

(54) INTELLIGENT VEHICLE SYSTEMS AND CONTROL LOGIC FOR INTRUSIVE DETECTION OF HIGH-VOLTAGE PATHWAY FAILURES

(71) Applicant: GM GLOBAL TECHNOLOGY OPERATIONS LLC, Detroit, MI (US)

(72) Inventors: Emil Francu, Northville, MI (US); Russell K. Steele, Clinton Township, MI (US); Andrew M. Zettel, Port Mood (CA); Rohit Singhal, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 435 days.

(21) Appl. No.: 17/713,491

(22) Filed: Apr. 5, 2022

(65) Prior Publication Data

US 2023/0311848 A1    Oct. 5, 2023

(51) Int. Cl.
*B60W 20/50* (2016.01)
*B60K 6/40* (2007.10)
(Continued)

(52) U.S. Cl.
CPC .............. *B60W 20/50* (2013.01); *B60K 6/40* (2013.01); *B60R 16/0231* (2013.01);
(Continued)

(58) Field of Classification Search
CPC ............. B60W 20/50; B60W 50/0205; B60W 50/038; B60W 2510/081;
(Continued)

(56) References Cited

U.S. PATENT DOCUMENTS 6,356,838 B1   3/2002   Paul
6,697,730 B2   2/2004   Dickerson
(Continued)

OTHER PUBLICATIONS

Powerslide, "Check Engine Light On—Control Messages Say All Systems Ok"?, 2015, bimmerpost.com, https://f80.bimmerpost.com/forums/showthread.php?t=1077072 (Year: 2015).*

(Continued)

*Primary Examiner* — Aniss Chad
*Assistant Examiner* — Chase L Cooley
(74) *Attorney, Agent, or Firm* — Quinn IP Law

(57) ABSTRACT

A method of operating a motor vehicle includes a vehicle controller receiving, from a first feedback sensor of an HV component, a first feedback signal indicative of an electrical characteristic of the HV component, and then detecting an HV system fault if the first feedback signal is less than a predefined electrical threshold. Upon detecting the system fault, the controller commands the HV component to operate at a commanded set-point; after sending the command, the controller receives, from a second feedback sensor of the HV component, a second feedback signal indicative of an operating characteristic of the HV component. An HV pathway failure is detected if the second feedback signal is not equal to or within a predefined operating range of the commanded set-point. Upon detecting the pathway failure in an HV electrical pathway of the HV component, the vehicle controller transmits a command signal to take a remedial action.

20 Claims, 4 Drawing Sheets

(51) Int. Cl.
*B60R 16/023* (2006.01)
*B60W 50/02* (2012.01)
*B60W 50/038* (2012.01)
*G07C 5/08* (2006.01)

(52) U.S. Cl.
CPC ...... *B60W 50/0205* (2013.01); *B60W 50/038* (2013.01); *G07C 5/0816* (2013.01); *B60W 2510/081* (2013.01); *B60W 2510/305* (2013.01); *B60W 2520/10* (2013.01); *B60W 2720/10* (2013.01); *B60Y 2200/92* (2013.01)

(58) Field of Classification Search
CPC ....... B60W 2510/305; B60W 2520/10; B60W 2720/10; B60W 2050/0215; B60W 10/26; B60W 30/146; B60W 50/029; B60W 50/14; B60W 2050/021; B60W 2050/022; B60W 2050/0292; B60K 6/40; B60R 16/0231; G07C 5/0816; B60Y 2200/92; B60L 3/04; B60L 3/0023; B60L 50/00; B60L 2240/12; B60L 2250/10; G01R 31/006; G01R 31/007
See application file for complete search history.

(56) References Cited

U.S. PATENT DOCUMENTS

| | | |
|---|---|---|
| 7,266,438 B2 | 9/2007 | Kellum et al. |
| 7,589,643 B2 | 9/2009 | Dagci et al. |
| 7,652,858 B2 | 1/2010 | Tang et al. |
| 7,739,036 B2 | 6/2010 | Grimm et al. |
| 7,840,427 B2 | 11/2010 | O'Sullivan |
| 8,050,855 B2 | 11/2011 | Coy et al. |
| 8,170,739 B2 | 5/2012 | Lee |
| 8,214,120 B2 | 7/2012 | Kothari et al. |
| 8,301,333 B2 | 10/2012 | Singh et al. |
| 8,384,532 B2 | 2/2013 | Szczerba et al. |
| 8,428,843 B2 | 4/2013 | Lee et al. |
| 8,605,011 B2 | 12/2013 | Seder et al. |
| 8,612,139 B2 | 12/2013 | Wang et al. |
| 8,633,979 B2 | 1/2014 | Szczerba et al. |
| 8,692,739 B2 | 4/2014 | Mathieu et al. |
| 8,818,708 B2 | 8/2014 | Mathieu et al. |
| 8,849,515 B2 | 9/2014 | Moshchuk et al. |
| 8,996,273 B2 | 3/2015 | Lee et al. |
| 9,014,915 B2 | 4/2015 | Chatterjee et al. |
| 9,096,134 B2 | 8/2015 | Namou et al. |
| 9,099,006 B2 | 8/2015 | Mudalige et al. |
| 9,229,453 B1 | 1/2016 | Lee |
| 9,238,412 B2 | 1/2016 | Kidston et al. |
| 9,267,810 B2 | 2/2016 | Pritchard |
| 9,283,967 B2 | 3/2016 | Lee |
| 9,443,429 B2 | 9/2016 | Mathieu et al. |
| 9,487,212 B1 | 11/2016 | Adam et al. |
| 9,809,130 B2 | 11/2017 | Heisel et al. |
| 9,868,443 B2 | 1/2018 | Zeng et al. |
| 9,931,963 B2 | 4/2018 | Heisel et al. |
| 9,947,052 B1* | 4/2018 | Slusar ............. G08G 1/096716 |
| 10,005,363 B1 | 6/2018 | Correia et al. |
| 10,164,522 B2* | 12/2018 | Kashyap ................. B60L 53/20 |
| 10,227,021 B2 | 3/2019 | Lor et al. |
| 10,259,341 B2 | 4/2019 | Lor et al. |
| 10,556,587 B2 | 2/2020 | Michaluk |
| 2009/0030885 A1 | 1/2009 | DePasquale et al. |
| 2010/0228415 A1 | 9/2010 | Paul |
| 2011/0059693 A1 | 3/2011 | O'Sullivan |
| 2011/0313880 A1 | 12/2011 | Paul et al. |
| 2012/0101713 A1 | 4/2012 | Moshchuk et al. |
| 2012/0239452 A1 | 9/2012 | Trivedi et al. |
| 2013/0032421 A1 | 2/2013 | Bonne et al. |
| 2013/0035821 A1 | 2/2013 | Bonne et al. |
| 2013/0054128 A1 | 2/2013 | Moshchuk et al. |
| 2013/0204676 A1 | 8/2013 | Hindi et al. |
| 2013/0219294 A1 | 8/2013 | Goldman-Shenhar et al. |
| 2014/0011522 A1 | 1/2014 | Lin et al. |
| 2014/0062349 A1* | 3/2014 | Isayeva ..................... G05B 9/02 318/139 |
| 2014/0335995 A1 | 11/2014 | Swales et al. |
| 2015/0077270 A1 | 3/2015 | Rubin et al. |
| 2015/0353082 A1 | 12/2015 | Lee et al. |
| 2015/0353085 A1 | 12/2015 | Lee |
| 2016/0016483 A1* | 1/2016 | Yasunori ............... H02J 7/1438 320/162 |
| 2016/0102986 A1 | 4/2016 | Ma et al. |
| 2016/0231124 A1 | 8/2016 | Nickolaou et al. |
| 2016/0260328 A1 | 9/2016 | Mishra et al. |
| 2016/0320194 A1 | 11/2016 | Liu et al. |
| 2016/0320195 A1 | 11/2016 | Liu et al. |
| 2016/0320198 A1 | 11/2016 | Liu et al. |
| 2016/0321566 A1 | 11/2016 | Liu et al. |
| 2016/0321771 A1 | 11/2016 | Liu et al. |
| 2017/0021830 A1 | 1/2017 | Feldman et al. |
| 2017/0136916 A1 | 5/2017 | Heisel et al. |
| 2017/0316684 A1 | 11/2017 | Jammoussi et al. |
| 2018/0134169 A1* | 5/2018 | Loftus ................. H02J 7/00712 |
| 2018/0257660 A1 | 9/2018 | Ibrahim et al. |
| 2018/0364700 A1 | 12/2018 | Liu et al. |
| 2018/0374341 A1 | 12/2018 | Branson et al. |
| 2019/0176630 A1* | 6/2019 | Luedtke .................. B60L 50/52 |
| 2019/0369626 A1 | 12/2019 | Lui et al. |
| 2019/0378412 A1 | 12/2019 | Zhu |
| 2021/0172996 A1 | 6/2021 | Sevel et al. |
| 2023/0094310 A1* | 3/2023 | Zhao ....................... B60L 58/14 701/22 |

OTHER PUBLICATIONS wikipedia.org, Proportional-integral-derivative controller, Jan. 29, 2022, wikipedia.org, rev. 76.178.139.135, pp. 1 (Year: 2022).*

* cited by examiner

INTELLIGENT VEHICLE SYSTEMS AND CONTROL LOGIC FOR INTRUSIVE DETECTION OF HIGH-VOLTAGE PATHWAY FAILURES

INTRODUCTION

The present disclosure relates generally to motor vehicles with electrified powertrains. More specifically, aspects of this disclosure relate to systems and methods for detecting failures in high-voltage pathways of electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motor(s) and the rechargeable energy storage system that supplies the requisite power for operating many hybrid-electric and full-electric powertrains. A contemporary traction battery pack may group stacks of battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the HV main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

SUMMARY

Presented herein are intelligent vehicle systems with attendant control logic for detecting high-voltage (HV) connection faults in electrified powertrains, methods for manufacturing and methods for operating such systems, and vehicles equipped with such systems. By way of example, there are disclosed systems and methods for intrusive software-based detection of HV pathway failures for components on a high-voltage bus. These HV bus connections are sequentially tested and, for each component, a preliminary feedback signal (e.g., from a dedicated voltage sensor) is compared against a respective component-calibrated preliminary signal threshold to detect a fault at that node. To determine if the fault is caused either by a faulty sensor or an unsolicited opening of the HV pathway, an intrusive check is conducted whereby a primary feedback signal specific to that component is compared against a respective component-calibrated primary signal threshold. If the intrusive check fails, a detected connection failure flag may be set and a central system controller may take remedial action, such as temporarily disabling the component, diverting operational responsibility from the faulty component to a suitable backup component, setting the vehicle in a limp-home mode, or disabling the vehicle.

Attendant benefits for at least some of the disclosed concepts include reduced HV system complexity, part costs, and manufacturing time by eliminating a physical high-voltage interlock loop (HVIL) wire across every HV component, cover, and switch. Additional cost and time savings may be realized by eliminating low-voltage pins in the high-voltage connector, and reducing hardware traces on the printed circuit board (PCB), hardware pins, and analog-to-digital (A2D) converter of the electronic control unit (ECU). Disclosed systems and methods may also provision rapid counteractive measures to protect the HV system and vehicle as well as instant notification to users when the vehicle experiences an opened HV pathway fault. Other attendant benefits may include the flexibility to turn disclosed features on/off for different regions based on local regulations and, thus, avoid redundant hardware, software, and calibrations. Disclosed systems and methods enable more accurate system fault detection by differentiating between diagnostic faults caused by a sensor fault and those caused by a disconnect on a high-voltage pathway.

Aspects of this disclosure are directed to intelligent control systems, system control logic, and closed-loop feedback control techniques for detecting pathway failures in HV electrical systems. In an example, a method is presented for operating a motor vehicle with a high-voltage electrical system, which includes one or more HV components each with a respective HV electrical pathway. This representative method includes, in any order and in any combination with any of the above and below disclosed options and features: receiving, e.g., via a resident or remote vehicle controller from a first feedback sensor within or coupled to the HV component, a first feedback signal indicative of an electrical characteristic of an HV component; detecting an HV system fault, e.g., via the vehicle controller confirming the first feedback signal is less than a predefined electrical threshold that is calibrated to the HV component; commanding, e.g., via the vehicle controller responsive to detecting the HV system fault, the HV component to operate at a commanded set-point that is calibrated to the HV component; receiving, e.g., via the vehicle controller from a second feedback sensor within or coupled to the HV component after commanding the HV component to operate at the commanded set-point, a second feedback signal indicative of an operating characteristic of the HV component; detecting a pathway failure in the HV component's electrical pathway, e.g., via the vehicle controller confirming the second feedback signal is not equal to or within a predefined operating range of the commanded set-point; and transmitting, e.g., via the vehicle controller to a central control unit, one or more command signals to take one or more remedial actions responsive to the detected HV pathway failure in the HV electrical pathway.

Aspects of this disclosure are also directed to computer-readable media (CRM) for detecting faulty electrical connections in high-voltage electrical systems. In an example, non-transitory CRM stores instructions executable by one or more processors of a vehicle controller, such as an electric HV Interlock Loop (eHVIL) application in a vehicle integration control module (VICM). These instructions, when executed by the processor(s), cause the vehicle controller to perform operations, including: receiving, from a first feedback sensor of the HV component, a first feedback signal indicative of an electrical characteristic of the HV component; detecting an HV system fault including determining if the first feedback signal is less than a predefined electrical threshold calibrated to the HV component; commanding, responsive to the detected HV system fault, the HV component to operate at a commanded set-point calibrated to the HV component; receiving, from a second feedback sensor of the HV component after commanding the HV component to operate at the commanded set-point, a second feedback signal indicative of an operating characteristic of the HV component; detecting an HV pathway failure in the HV electrical pathway including determining if the second feedback signal is not equal to or within a predefined operating range of the commanded set-point, the predefined operating range calibrated to the HV component; and transmitting a command signal to take a remedial action responsive to the detected HV pathway failure in the HV electrical pathway of the HV component.

Additional aspects of this disclosure are directed to intelligent motor vehicles with HV pathway failure detection capabilities. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive vehicle includes a vehicle body with a passenger compartment, multiple road wheels mounted to the vehicle body (e.g., via corner modules coupled to a unibody or body-on-frame chassis), and other standard original equipment. One or more electric traction motors operate alone (e.g., for FEV powertrains), or in conjunction with an engine assembly (e.g., for HEV powertrains), to selectively drive one or more of the road wheels to propel the vehicle. An HV electrical system electrically connects a traction battery pack with the traction motor(s). Multiple distinct HV components electrically connect to the HV electrical system via respective HV electrical pathways.

Continuing with the discussion of the preceding example, the vehicle employs one or more of a dedicated or shared or central controller or control module or network of controllers/modules (collectively "controller") to govern operation of the HV electrical system. The vehicle controller communicates with a feedback sensor of the HV component to receive a feedback signal indicative of an electrical characteristic of the HV component, and detects an HV system fault if this feedback signal is less than a predefined component-calibrated electrical threshold. Upon detecting a system fault, the controller responsively commands the HV component to operate at a component-calibrated commanded set-point. After commanding the HV component to operate at the commanded set-point, the controller communicates with a feedback sensor of the HV component to receive a feedback signal indicative of an operating characteristic of the HV component. The controller detects an HV pathway failure in the HV component's electrical pathway if this feedback signal is not equal to or within a predefined operating range of the commanded set-point. Upon detecting an HV pathway failure, the controller transmits a command signal to take a remedial action, e.g., to protect the HV electrical system and motor vehicle.

For any of the disclosed systems, methods, and vehicles, the controller may also receive an operating state signal indicating that the motor vehicle is either powered on (main contractors closed) or powering on (pre-charge contactors closed). If the motor vehicle is powered on when the first feedback signal is not less than the predefined electrical threshold, the controller may responsively communicate again with the first feedback sensor to receive another feedback signal that is indicative of the HV component's electrical characteristic. The controller then determines if this new feedback signal is less than the predefined electrical threshold. By comparison, if the operating state signal indicates that the motor vehicle is powering on when the first feedback signal is not less than the predefined electrical threshold, the controller may responsively transmit an electronic notification indicating that a HV system fault was not detected (eHVIL pass).

For any of the disclosed systems, methods, and vehicles, the vehicle controller may actively determine if a real-time vehicle speed of the motor vehicle is below a preset maximum speed. In this instance, the controller may transmit the command signal(s) only upon determining that the vehicle speed is below the preset maximum speed. The remedial action may include disconnecting an HV battery pack of the motor vehicle from the HV electrical system and concomitantly turning off the motor vehicle. As yet a further option, the remedial action may include setting the vehicle in a limp-home operating mode and concomitantly restricting the vehicle's speed to below a preset maximum limp-home speed. In addition, or alternatively, the remedial action may include disconnecting the subject HV component from the motor vehicle's resident HV battery pack.

For any of the disclosed systems, methods, and vehicles, the controller may respond to the second feedback signal being equal to or within the predefined operating range of the commanded set-point by transmitting an electronic notification indicating that an HV pathway failure was not detected (eHVIL pass). In this instance, the vehicle controller may respond to the first feedback signal being less than the predefined electrical threshold by transmitting an electronic notification indicating that an HV system fault was detected and the fault was caused by a faulty feedback sensor (eHVIL pass & sensor fault). In some system architectures, the first feedback sensor may be the same as or distinct from the second feedback sensor. In the same vein, the electrical characteristic may be the same as or distinct from the operating characteristic. For instance, the first feedback signal may be a feedback voltage value, and the electrical characteristic is an operating voltage of the HV component across an HV bus. By way of comparison, the second feedback signal may be a voltage value, a pressure/speed value, a current/speed value, or a temperature value, and the operating characteristic is a power module output voltage, a compressor output pressure/speed, a motor current/speed, or a heater output temperature, respectively.

For any of the disclosed systems, methods, and vehicles, the controller may also respond to the first feedback signal being less than the predefined electrical threshold by determining whether or not a sensor fault flag exists (e.g., sensor fault set in memory as vehicle powering on). If the first feedback signal is less than the predefined electrical threshold and yet a sensor fault flag does not exist, the vehicle controller may responsively transmit a command signal to take one or more remedial actions (eHVIL fail & no further eHVIL evaluation required). On the other hand, the vehicle controller may respond to the sensor fault flag existing by waiting to receive a contactor closed signal indicating the main electrical contactors of the motor vehicle's resident HV battery pack are closed. Responsive to receiving the contactor closed signal and the sensor fault flag existing, the controller may then evaluate whether or not the HV pathway failure exists by determining if the second feedback signal is not equal to or within the predefined operating range of the set-point (eHVIL fail).

The above Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
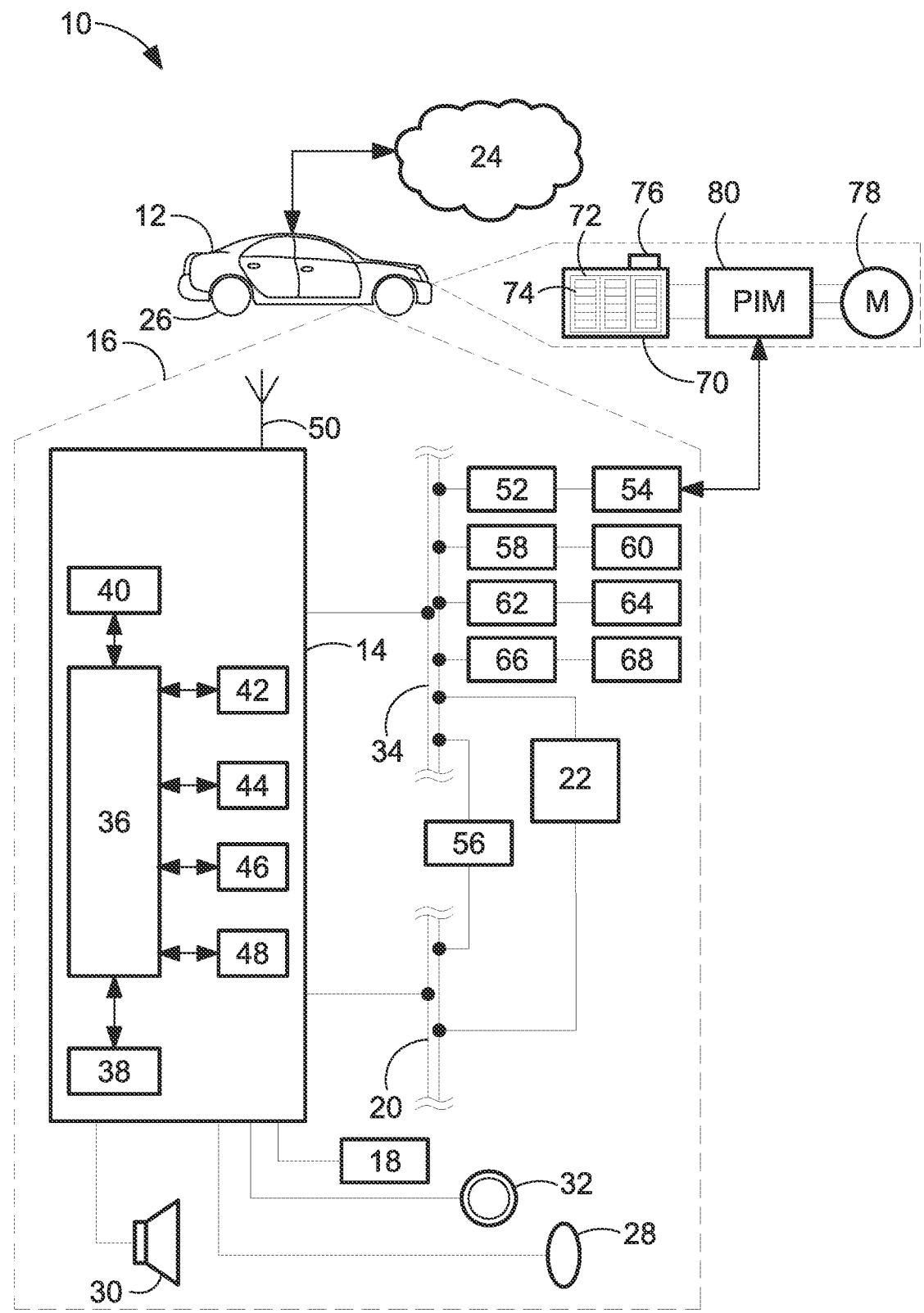
FIG. 1 is a partially schematic, side-view illustration of a representative motor vehicle with an electrified powertrain, a rechargeable energy storage system, and a network of in-vehicle controllers and sensing devices for detecting connection faults in an HV electrical system in accordance with aspects of the disclosed concepts.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles and HV electrical systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. Other appropriate communication interfaces may include those that conform with ISO, SAE, and/or IEEE standards and specifications. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, governing operation of a vehicle transmission, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range vehicle communication capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each having a stack of battery cells 74, such as lithium-class, zinc-class, nickel-class, or organosilicon-class battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

During operation of the motor vehicle 10, it may be desirable to sequentially test the electrical connections of the individual components on a high-voltage (HV) direct current (DC) bus of the in-vehicle HV electrical system. As will be described in extensive detail below, a dedicated control module, such as an electric High Voltage Interlock Loop (eHVIL) application, communicates with a central controller, such as a vehicle integration control module (VICM), to compare multiple feedback signals against respective component-calibratable thresholds to detect system faults and unsolicited openings of high-voltage pathways. By way of non-limiting example, the diagnostic protocol may first ping a corresponding feedback sensor for a respective HV connector of the component under evaluation. This is followed by an intrusive check of a related operating characteristic of the HV component to gauge the validity of sensor readings in the connectors. Sensor feedback is collected and evaluated to determine continuity in the high-voltage pathway. In other words, after identifying a system fault through evaluation of an electrical operating characteristic (e.g., feedback voltage signals) of a subject HV component, the system effects an intrusive check on a feedback sensor to evaluate a functional operating characteristic (e.g., output voltage, compressor pressure/speed, motor current/speed, heater temperature/thermal output, etc.) to thereby differentiate an open HV pathway from a mere sensor fault.

Figure 2:
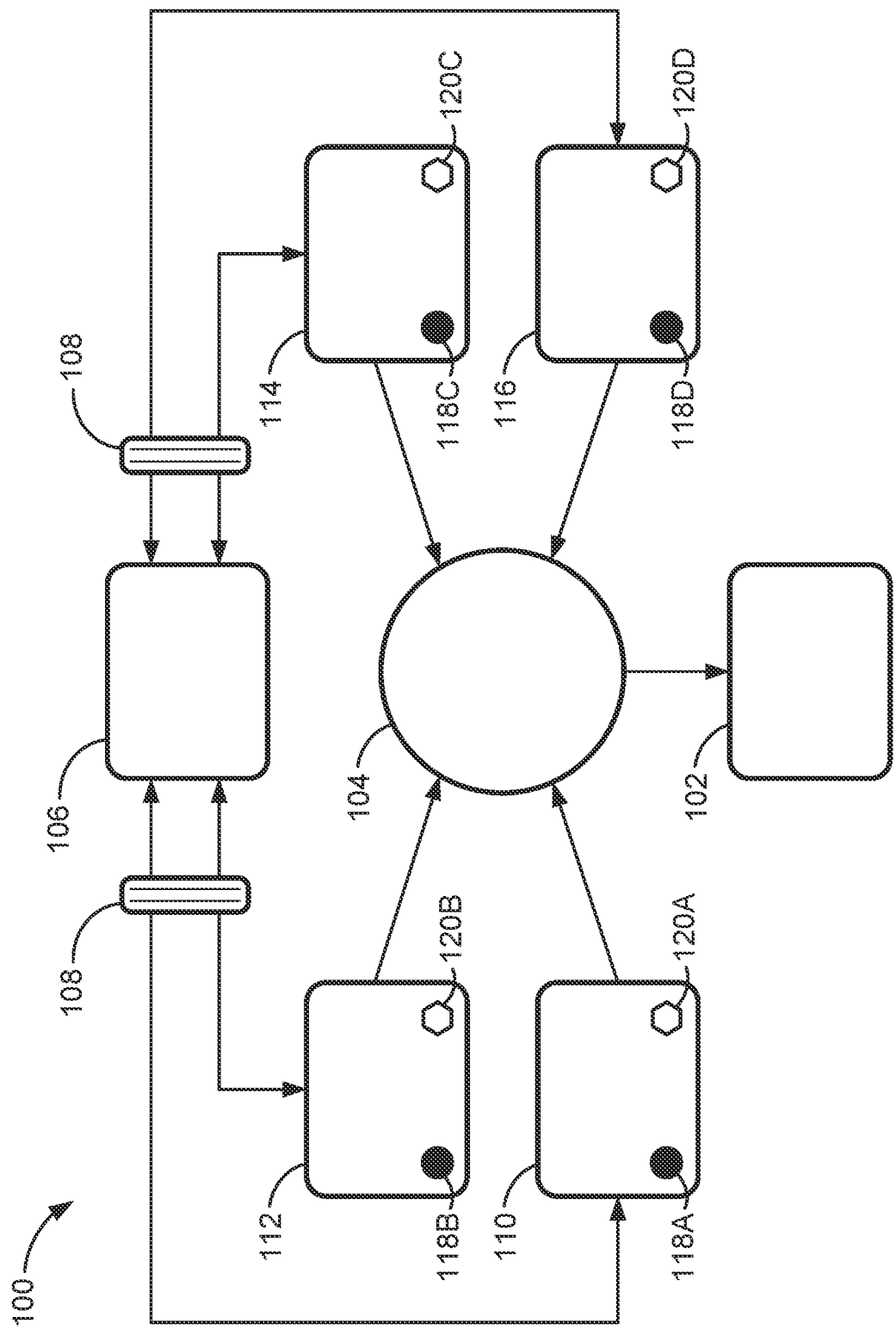
FIG. 2 is a diagrammatic illustration of a representative intelligent vehicle system for provisioning intrusive software-based detection of HV pathway failures in accord with aspects of this disclosure.

With reference next to FIG. 2, there is shown a schematic diagram of a representative high-voltage electrical system 100 for an electrified powertrain of a motor vehicle, such as vehicle 10 of FIG. 1. Although differing in appearance, it is envisioned that any of the features and options described above with reference to the HV hardware components 16 of FIG. 1 may be incorporated, singly or in any combination, into the HV electrical system 100 of FIG. 2, and vice versa. As a point of similarity, the HV electrical system 100 of FIG. 2 employs a Central Processing Unit (CPU) 102, which may offer centralized system control and may be embodied as a stand-alone VICM. A distributed array of HV components communicate with the CPU 102 through an HV system diagnostics module 104, which may be embodied as an eHVIL application embedded within the VICM. As another comparable point of similarity, the HV components of FIG. 2 are powered by a resident rechargeable energy storage system, portrayed as an electric vehicle battery (EVB) 106 that transmits electrical power across an HVDC bus 108. It should be appreciated that the HV electrical system 100 of FIG. 2 has been greatly simplified and is provided solely to facilitate description of some of the novel features of the disclosed concepts. As such, the system 100 may incorporate greater or fewer or alternative HV components from those that are shown in the Figures, which may be arranged in any logically suitable architecture to provision a desired vehicle functionality.

There are four representative HV electrical components operatively interconnected within the HV electrical system 100 of FIG. 2: an air conditioning electric compressor (ACEC) 110, an auxiliary power module (APM) 112, a rear power inverter module (RPIM) 114, and a coolant electric heater (CEH) 116. The ACEC 110 may be in the nature of a motor-driven, scroll-type hermetic compressor that selectively pressurizes and heats ambient air or cabin air for circulation/recirculation through a passenger compartment of the vehicle. In contrast, the APM 112 may be a bidirectional, step-down DC-to-DC power converter device that reduces the high-voltage power output from the EVB 106 (e.g., 240-460V) to a low-voltage output (e.g., 10-16V) for distribution to an assortment of auxiliary devices within the vehicle. The RPIM 114, on the other hand, may be in the nature of a pulse-width modulated electronic switching device that is designed to convert DC power output by the EVB 106 into AC power for electrically powering a multiphase traction motor, such as motor 78 of FIG. 1. During a regenerative braking operation, the RPIM 114 may be employed to convert AC power output by the traction motor, which may be integrated into a rear drive unit, for recharging the EVB 106. By way of comparison, the CEH 116 may be a dedicated coolant heater that selectively warms a coolant before it is circulated through EVB 106 and other select components of the HV system 100.

Figure 3A:
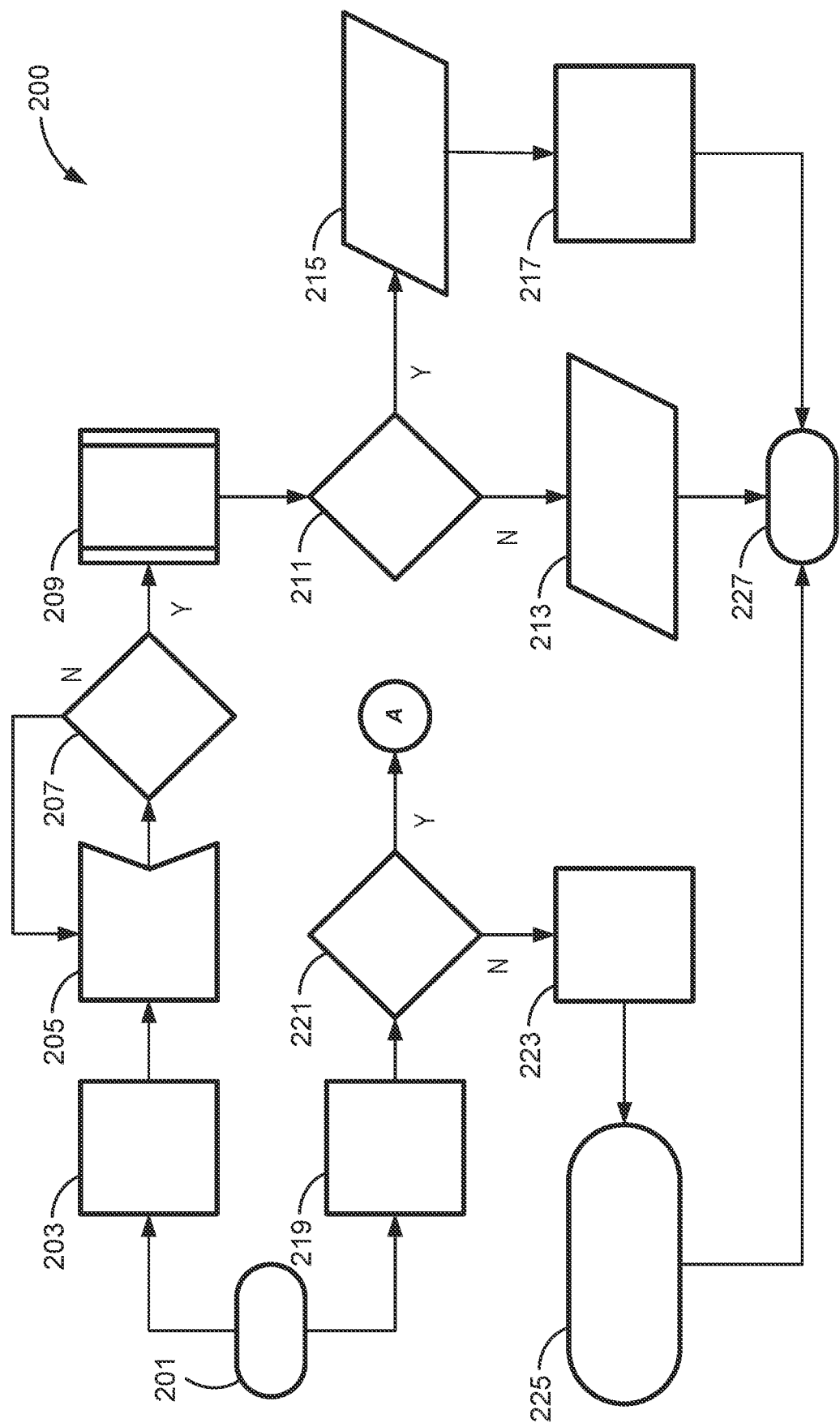
FIGS. 3A and 3B present a flowchart illustrating a representative fault detection algorithm for identifying failures in electrical connections of an HV electrical system, which may correspond to memory-stored instructions that are executable by a resident or remote controller, control-logic circuit, programmable control unit, or other integrated circuit (IC) device or network of devices in accord with aspects of the disclosed concepts.
Figure 3B:
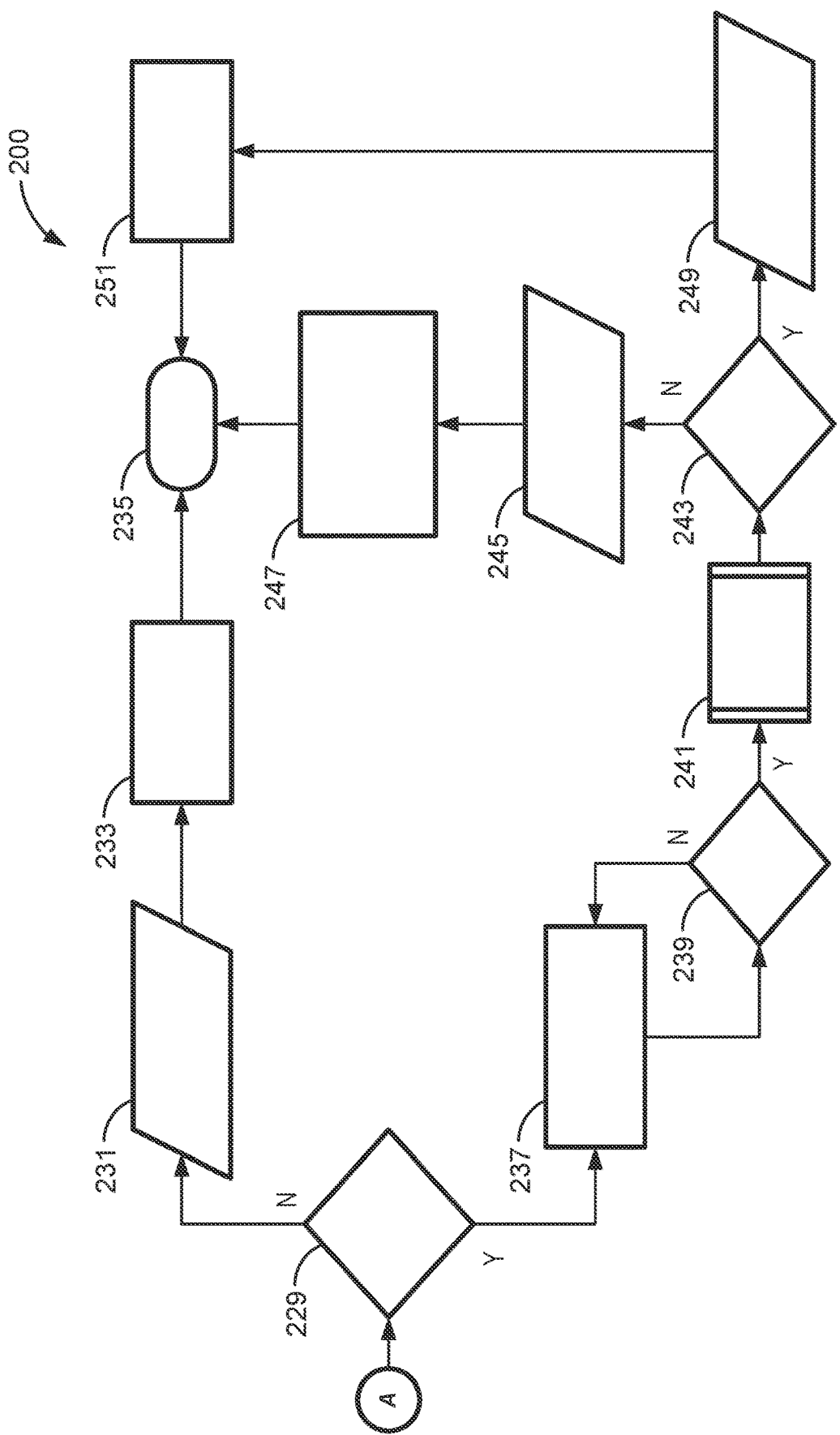

With reference next to the flow chart of FIGS. 3A and 3B, an improved method or control strategy for intrusive detection of connection failures in an electrical system, such HV electrical system 100 of FIG. 2, is generally described at 200 in accordance with aspects of the present disclosure. Some or all of the operations illustrated in FIGS. 3A and 3B, and described in further detail below, may be representative of an algorithm that corresponds to processor-executable instructions that are stored, for example, in main or auxiliary or remote memory, and executed, for example, by an electronic controller, processing unit, logic circuit, or other module or device or network of modules/devices, to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 200 begins at terminal block 201 with memory-stored, processor-executable instructions for a programmable controller or control module or similarly suitable processor to call up an initialization procedure for a fault detection algorithm. This routine may be executed in real-time, near real-time, continuously, systematically, sporadically, and/or at regular time intervals, for example, each 10 or 100 milliseconds during normal and ongoing operation of a motor vehicle, such as automobile 10 of FIG. 1. As yet another option, terminal block 201 may initialize responsive to a user command prompt, a resident vehicle controller prompt, or a broadcast prompt signal received from an "off-board" centralized vehicle services system (e.g., cloud host service 24). In accord with the illustrated examples, CPU 102 may trigger method 200 responsive to a "key on" signal received from a vehicle operator to power on the motor vehicle 10. Upon completion of some or all of the control operations presented in FIGS. 3A and 3B, the method 200 may advance to terminal block 227 or 235 and temporarily terminate or, optionally, may loop back to terminal block 201 and run in a continuous loop.

Method 200 advances from terminal block 201 to either process block 203 or process block 219 depending, for example, on the current operating state of the motor vehicle. For instance, CPU 102 may communicate with a power electronics module of the EVB 106 to ascertain whether a set of main contactors is closed and, thus, the vehicle is powered on, as indicated at process block 203, or a set of pre-charge contactors is closed and, thus, the vehicle is in the process of powering on, as indicated at process block 219. The EVB main contactors (not shown) are electrical switches that, when closed, electrically connect the EVB 106 with the vehicle's high voltage and low voltage electrical systems so that electrical energy may be made available to the electric motor(s) 78 for driving the vehicle 10. Comparatively, the EVB pre-charge contactors (not shown) may be electrical switches with in-series resistors that militate against in-rush power surges by allowing only a limited current to flow from the EVB 106, e.g., to prevent current arcs that may cause the main contactors to weld closed. Until powering-on procedures are complete, the EVB 106 may be restricted to transmitting little or no electrical current to the motor 78.

If the vehicle is already powered on, method 200 transitions from terminal block 201, through process block 203, to signal input block 205 to check the device status of each HV component within the HV electrical system. For instance, the eHVIL 104 may ping a respective (first) feedback sensor of the HV component under evaluation to collect a set of (first) feedback signals indicative of an electrical characteristic of that HV component. As shown, the four HV components of FIG. 2 are equipped with respective voltage sensors 118A-118D that monitor and output electrical signals indicative of a real-time operating voltage of each component. It should be appreciated that the eHVIL 104 may evaluate additional or alternative electrical characteristics of the HV components, including operating current, resistance, etc. Additionally, one or more of all of the HV components in the HV electrical system 100 may share a feedback sensor.

After aggregating, preprocessing, and filtering the feedback sensor signal(s) received at signal input block 205, method 200 attempts to detect any HV system faults at decision block 207 by determining if each (first) feedback signal is less than a predefined electrical threshold calibrated to that specific HV component. For instance, sensor signals from the APM voltage sensor 118B are compared to a distinct voltage threshold calibrated to the APM 112 (e.g., sized at 1.8 kW or 130 A at 12.6V). Conversely, sensor signals from the RPIM voltage sensor 118C are compared to a distinct voltage threshold calibrated to the RPIM 114 (e.g., 12V DC). If the feedback sensor signal(s) from the respective voltage sensor 118A-118D indicate that the operating voltage of the HV component under evaluation is equal to or greater than the corresponding voltage threshold for that component (block 207=NO), CPU 102 may conclude that there is no fault present at that component. In response, method 200 may loop back to signal input block 205 and repeat the status check process for all HV components selected for evaluation. Once all selected components have been evaluated and no system faults are detected, method 100 may proceed to terminal block 227 and temporarily stop.

If the feedback sensor signal(s) indicate that the operating voltage of the HV component under evaluation is less than the corresponding voltage threshold for that component (block 207=YES), method 200 of FIG. 3A may set a system fault flag and execute predefined process block 209 to run an eHVIL intrusive check for any HV component in which a system fault was detected. Generally speaking, "intrusive feedback" is a feedback response by an HV component responsive to a system-generated "intrusive command." A command may be typified as "intrusive" by prompting an HV component to operate at a commanded set-point solely for the purpose of a diagnostic evaluation. The eHVIL 104 may instruct the HV component under evaluation to operate at a commanded set-point and then ping a respective (second) feedback sensor of the fault-flagged HV component to collect a set of (second) feedback signals indicative of an operating characteristic of that HV component. As shown, the four HV components of FIG. 2 are equipped with respective intrusive feedback sensors 120A-120D that monitor and output electrical signals indicative of a real-time operating characteristic of each component. Additionally, one or more of the HV components in the HV electrical system 100 may share an intrusive feedback sensor.

During an intrusive check, the eHVIL 104 of FIG. 2 may command the APM 112 to operate at an APM-calibrated operating voltage set-point (e.g., intrusive 14V output voltage, increased from 12V resting voltage). A real-time voltage output from the APM 112 is then measured by a respective (second) feedback sensor, namely output voltage sensor 120B; this real-time output voltage is the intrusive feedback operating characteristic of the APM 112. Comparatively, the eHVIL 104 may command the ACEC 110 to operate at an ACEC-calibrated compressor speed set-point (e.g., intrusive compressor speed of 2200-2500 RPM) or output temperature set-point (e.g., intrusive cabin temperature decrease of 10 degrees Fahrenheit (° F.)). A real-time output speed of the ACEC 110 is then measured by a respective (second) feedback sensor, namely speed sensor 120A. For the CEH 116, the component-calibrated set-point may include an operating current (e.g., intrusive 5-amp (A) heater operating current) or an output temperature (e.g., coolant temperature increase of 5° F.), which may be monitored by a current/temperature sensor 120C that is operatively attached to the CEH 116. As per the RPIM 114, the respective component-calibrated set-point may include an output current (e.g., intrusive 2-amp AC output) or motor speed (e.g., with vehicle at rest, holding speed of 500 RPM), which may be monitored by a current/speed sensor 120D that is resident to or packaged separately from the RPIM 114. It should be appreciated that the eHVIL 104 may evaluate additional or alternative operating characteristics of the HV components.

After aggregating, preprocessing, and filtering the intrusive feedback sensor signal(s) collected at predefined process block 209, method 200 attempts to detect any HV pathway failures at decision block 211 by determining if each (second) feedback signal is approximately equal to or within a predefined operating range of the commanded set-point. When running an eHVIL intrusive check, for example, the eHVIL 104 may compare the respective intrusive feedback values of the faulted HV component (e.g., ACEC compressor speed, APM output voltage, RPIM output current, CEH operating current) against its respective intrusive set-point value and determine if the measured intrusive feedback value is equal to or within a component-calibrated range of the commanded set point (e.g., ±3%; ±0.5V; ±100 RPM; ±0.1 A, etc.). By way of example, and not limitation, the eHVIL 104 may command the ACEC 110 to operate at a calibrated compressor speed set-point of 2500 RPM; if the ACEC speed sensor 120A measures a compressor speed of zero (0) RPM, an ACEC cable disconnect is flagged. If an HV cable disconnect or other pathway failure is not detected (block 211=NO), method 200 proceeds to execute data input/output block 213 and generates an electronic signal indicating an HV pathway failure has not been detected. Block 213 may include the eHVIL 104 transmitting to the CPU 102 an "eHVIL pass" diagnostic notification; this notification may be accompanied by a "sensor faulty" diagnostic alert.

If the measured intrusive feedback signal is not equal to or within the predefined component-calibrated operating range of the commanded set-point (block 211=YES), method 200 responsively executes data input/output block 215 and generates an electronic signal indicating an HV pathway failure has been detected. Block 215 may include the eHVIL 104 transmitting to the CPU 102 an "eHVIL fail" diagnostic notification, which may be accompanied by a request to take corrective action. Upon receipt of this request, the method 200 may responsively set a memory-stored faulty connection flag and take a remedial action, as indicated at process block 217. In accord with the representative system architecture of FIG. 2, CPU 102 may save in a memory-stored diagnostic code log a diagnostic trouble code (DTC), which may be used by service personnel to identify and diagnose a necessary repair. At the same time, the CPU 102 may communicate with a PCM or vehicle speed sensor to ascertain whether or not a real-time vehicle speed of the motor vehicle 10 is below a preset maximum speed (e.g., 10 MPH). If so, the CPU 102 may operatively disconnect the EVB 106 from the HV electrical system 100 including and, thus, the vehicle's prime mover(s), and may synchronously turn off the vehicle 10. If the vehicle's present vehicle speed exceeds the preset maximum speed, the CPU 102 may set the vehicle in a limp-home operating mode and concomitantly limit the vehicle's speed to not exceed a preset maximum limp-home speed. Other remedial actions may include, but are certainly not limited to, disconnecting the pathway-faulty HV component from the EVB 106, alerting the vehicle driver and/or service personnel to the HV pathway failure, etc.

After confirming that the host vehicle is in the process of powering on, e.g., with the pre-charge contactors closed, method 200 of FIG. 3A transitions from terminal block 201, through process block 219, to decision block 221 to determine if a system fault exists in one or more or all of the HV components. Decision block 221 may be substantially identical to, and therefore may contain the same or similar processor-executable operations to those described above for, decision block 207. In the same vein, decision block 221 may be proceeded by or contain operations similar to those described above with respect to signal input block 205. For example, if the electrical feedback sensor signal(s) from one of the respective feedback sensors 118A-118D of FIG. 2 indicate that the electrical operating characteristic of the HV component under evaluation is equal to or greater than the corresponding calibrated threshold for that component (block 221=NO), CPU 102 may conclude that there is no fault present at that component. Method 200 may responsively proceed to execute data input/output block 223 and generate an electronic signal indicating an HV pathway failure has not been detected, similar to data input/output block 213. In tandem, method 200 may thereafter execute process block 225, whereat Central Control (e.g., CPU 102) completes out eHVIL diagnostics and continues to conclusion any remaining pre-charge procedures. Upon completion of some or all of the operations illustrated in FIG. 3A, method 200 may transition to reference connector (A).

If the feedback sensor signal(s) reveal that the measured electrical characteristic of the evaluated HV component is less than its corresponding threshold (block 221=YES), method 200 transitions to reference connector (A) on FIG. 3B, which indicates an algorithm transition or "jump" from method 200 on page 3/4 of the drawings to method 200 on page 4/4 of the drawings. From there, method 200 executes decision block 229 to ascertain whether or not a sensor fault flag already exists. For instance, CPU 102 may access a memory-stored diagnostic code log and lookup the system-faulted HV component to check if a sensor fault flag was previously set for that component. If not (block 229=NO), method 200 responsively executes data input/output block 231 and generates an electronic signal indicating an HV pathway failure has been detected for the evaluated HV component, as described above with respect to input/output block 215 of FIG. 3A. Responding to block 231 of FIG. 3B, the method 200 may automatically execute process block 233, set a memory-stored faulty connection flag, and take a remedial action, as described above with respect to process block 217 of FIG. 3A.

Upon determining that a sensor fault flag does exist (block 229=YES), method 200 responsively advances to process block 237 to wait for a Main Contactor Closed signal from Central Control indicating that the EVB's main contactors have now closed and the motor vehicle is now in a powered on operating mode. Method 200 thereafter executes decision block 239 to determine if a Main Contactor Closed signal is received, e.g., via eHVIL 104 from CPU 102; if not (block 239=NO), method 200 may circle back to process block 237 and run in a continuous loop until the signal is received or, if desired, an infinite loop exit is triggered (e.g., the vehicle operator powers off the HV electrical system 200).

Once a Main Contactor Closed signal is received (block 239=YES), method 200 executes predefined process block 241 of FIG. 3B to run an eHVIL intrusive check for each HV component in which a system fault was detected, as described above with respect to predefined process block 209 of FIG. 3A. Method 200 then advances to decision block 243 of FIG. 3B and attempts to detect if there is an HV pathway failure for each system-faulted HV component, as described above with respect to decision block 211 of FIG. 3A. If an HV cable disconnect or other pathway failure is not detected (block 243=NO), method 200 proceeds to execute data input/output block 245 and generates an electronic signal indicating an HV pathway failure has not been detected (see block 213 of FIG. 3A). Block 243 may also include the eHVIL 104 transmitting to the CPU 102 an "eHVIL pass" diagnostic notification; this notification may be accompanied by a "sensor faulty" diagnostic alert. Central Control then completes out the eHVIL diagnostics protocol and transmits the appropriate command signals to enable vehicle propulsion via EVB 106 through HV electrical system 100 at process block 247.

If a measured intrusive feedback signal is not equal to or within the corresponding predefined component-calibrated operating range of a commanded set-point (block 243=YES), method 200 responsively executes data input/output block 249 and generates an electronic signal indicating an HV pathway failure has been detected, as described above with respect to input/output block 215. Method 200 responsively executes process block 251 to set a memory-stored faulty connection flag and take a remedial action, as described above with respect to process block 217. At this juncture, method 200 may proceed to terminal block 235 and terminate.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle with an HV battery pack and a high-voltage (HV) electrical system connecting an HV device with the HV battery pack via an HV electrical pathway, the method comprising:
    receiving, via a vehicle controller from a first feedback sensor of the HV device, a first feedback signal indicative of an electrical characteristic of the HV device, the electrical characteristic including a voltage, a current, or a resistance of the HV device when connected to the HV battery pack;
    detecting an HV system fault responsive to determining the first feedback signal is less than a predefined electrical threshold calibrated to the HV device;
    commanding, via the vehicle controller responsive to the detected HV system fault, the HV device to operate at a commanded set-point calibrated to the HV device;
    receiving, via the vehicle controller from a second feedback sensor of the HV device after commanding the HV device to operate at the commanded set-point, a second feedback signal indicative of an operating characteristic of the HV device;
    detecting an HV pathway failure in the HV electrical pathway of the HV device responsive to determining the second feedback signal is not equal to or within a predefined operating range of the commanded set-point, the predefined operating range calibrated to the HV device; and
    transmitting, via the vehicle controller, a command signal to take a remedial action responsive to the detected HV pathway failure in the HV electrical pathway of the HV device.

2. The method of claim 1, further comprising:
    receiving, via the vehicle controller, an operating state signal indicating the motor vehicle is either powered on or powering on;
    receiving, via the vehicle controller from the first feedback sensor responsive to the operating state signal indicating the motor vehicle is powered on and the first feedback signal not being less than the predefined electrical threshold, a third feedback signal indicative of the electrical characteristic of the HV device; and
    determining if the third feedback signal is less than the predefined electrical threshold.

3. The method of claim 2, further comprising transmitting, via the vehicle controller responsive to the operating state signal indicating the motor vehicle is powering on and the first feedback signal not being less than the predefined electrical threshold, an electronic notification indicating the HV system fault is not detected.

4. The method of claim 1, further comprising determining, via the vehicle controller, if a vehicle speed of the motor vehicle is below a preset maximum speed, wherein transmitting the command signal is further in response to the vehicle speed being below the preset maximum speed.

5. The method of claim 4, wherein the remedial action includes disconnecting the HV battery pack of the motor vehicle from the HV electrical system and turning off the motor vehicle.

6. The method of claim 1, wherein the remedial action includes setting the motor vehicle in a limp-home operating mode and restricting a vehicle speed of the motor vehicle to below a preset maximum limp-home speed.

7. The method of claim 1, wherein the remedial action includes disconnecting the HV device from the HV battery pack resident to the motor vehicle.

8. The method of claim 1, further comprising transmitting, via the vehicle controller responsive to the second feedback signal being equal to or within the predefined operating range of the commanded set-point, an electronic notification indicating the HV pathway failure is not detected.

9. The method of claim 8, further comprising transmitting, via the vehicle controller responsive to the first feedback signal being less than the predefined electrical threshold, an electronic notification indicating the HV system fault is detected and the first feedback sensor is faulty.

10. The method of claim 1, further comprising:
    determining, via the vehicle controller responsive to the first feedback signal being less than the predefined electrical threshold, whether or not a sensor fault flag exists; and
    transmitting, via the vehicle controller, a command signal to take the remedial action responsive to the first feedback signal being less than the predefined electrical threshold and the sensor fault flag not existing.

11. The method of claim 10, further comprising:
    receiving, via the vehicle controller responsive to the sensor fault flag existing, a contactor closed signal indicating main electrical contactors of an HV battery pack of the motor vehicle are closed; and
    detecting, via the vehicle controller responsive to receiving the contactor closed signal and the sensor fault flag existing, the HV pathway failure including determining if the second feedback signal is not equal to or within the predefined operating range of the commanded set-point.

12. The method of claim 1, wherein the first feedback sensor is distinct from the second feedback sensor, and the electrical characteristic is distinct from the operating characteristic.

13. The method of claim 1, wherein the first feedback signal is a voltage value, and the electrical characteristic is an operating voltage of the HV device across an HV bus, and wherein the second feedback signal is a voltage value, a pressure/speed value, a current/speed value, or a temperature value, and the operating characteristic is a power module output voltage, a compressor output pressure/speed, a motor current/speed, or a heater output temperature.

14. A non-transitory, computer-readable medium storing instructions executable by one or more processors of a vehicle controller of a motor vehicle, the motor vehicle including a high-voltage (HV) electrical system electrically connecting first and second active HV devices with an HV battery pack via respective first and second HV electrical pathways, the instructions, when executed by the one or more processors, causing the vehicle controller to perform operations comprising:

receiving, from first and second voltage sensors of the first and second HV devices, respectively, first and second sensor signals indicative of first and second feedback voltages of the first and second HV devices, respectively;

detecting an HV system fault responsive to determining the first feedback voltage is less than a first predefined electrical threshold calibrated to the first HV device and/or the second feedback voltage is less than a second predefined electrical threshold calibrated to the second HV device;

commanding, responsive to the detected HV system fault, the first HV device to operate at a commanded set-point calibrated to the first HV device;

receiving, from an intrusive feedback sensor of the first HV device after commanding the first HV device to operate at the commanded set-point, an intrusive feedback signal indicative of a real-time operating characteristic of the first HV device;

detecting an HV pathway failure in the first HV electrical pathway responsive to determining the intrusive feedback signal is not equal to or within a predefined operating range of the commanded set-point, the predefined operating range calibrated to the first HV device; and transmitting a command signal to take a remedial action responsive to the detected HV pathway failure in the first HV electrical pathway of the first HV device.

15. A motor vehicle, comprising:
a vehicle body;
a plurality of road wheels attached to the vehicle body;
a traction motor attached to the vehicle body and operable to drive one or more of the road wheels to thereby propel the motor vehicle;
a traction battery pack storing and supplying power to the traction motor;
a high-voltage (HV) electrical system electrically connecting the traction battery pack with the traction motor;
an HV device electrically connected to the HV electrical system via an HV electrical pathway; and
a vehicle controller programmed to:
receive a first feedback signal from a first feedback sensor of the HV device indicative of an electrical characteristic of the HV device, the electrical characteristic including a voltage, a current, or a resistance of the HV component when connected to the HV battery pack;
detect an HV system fault responsive to determining the first feedback signal is less than a predefined electrical threshold calibrated to the HV device;
responsive to the detected HV system fault, command the HV device to operate at a commanded set-point calibrated to the HV device;
after commanding the HV device to operate at the commanded set-point, receive a second feedback signal from a second feedback sensor of the HV device indicative of an operating characteristic of the HV device;
detect an HV pathway failure in the HV electrical pathway of the HV device responsive to determining the second feedback signal is not equal to or within a predefined operating range of the commanded set-point; and
transmit a command signal to take a remedial action responsive to the detected HV pathway failure in the HV electrical pathway of the HV device.

16. The motor vehicle of claim 15, wherein the vehicle controller is further programmed to:
receive an operating state signal indicating the motor vehicle is powered on;
responsive to the motor vehicle being powered on and the first feedback signal not being less than the predefined electrical threshold, receive from the first feedback sensor a third feedback signal indicative of the electrical characteristic of the HV device; and
determine if the third feedback signal is less than the predefined electrical threshold.

17. The motor vehicle of claim 15, wherein the vehicle controller is further programmed to:
receive an operating state signal indicating the motor vehicle is powering on; and
responsive to the motor vehicle powering on and the first feedback signal not being less than the predefined electrical threshold, transmit an electronic notification indicating the HV system fault is not detected.

18. The motor vehicle of claim 15, wherein the vehicle controller is further programmed to determine if a vehicle speed of the motor vehicle is below a preset maximum speed, wherein transmitting the command signal is further in response to the vehicle speed being below the preset maximum speed, and wherein the remedial action includes disconnecting the HV battery pack of the motor vehicle from the HV electrical system and turning off the motor vehicle.

19. The motor vehicle of claim 15, wherein the vehicle controller is further programmed to respond to the second feedback signal being equal to or within the predefined operating range of the commanded set-point by transmitting an electronic notification indicating the HV pathway failure is not detected.

20. The motor vehicle of claim 19, wherein the vehicle controller is further programmed to respond to the first feedback signal being less than the predefined electrical threshold by transmitting an electronic notification indicating the HV system fault is detected and the first feedback sensor is faulty.

\* \* \* \* \*